United States Patent [19]

Freppel

[11] Patent Number: 4,507,451

[45] Date of Patent: Mar. 26, 1985

[54] PROCESS FOR PREPARING BIMODAL AND MULTIMODAL POLYMERS OF CONJUGATED DIENES

[75] Inventor: Christian Freppel, Chamalieres, France

[73] Assignee: Compagnie Generale des Etablissements Michelin, Clermont-Ferrand, France

[21] Appl. No.: 559,833

[22] Filed: Dec. 8, 1983

Related U.S. Application Data

[63] Continuation of Ser. No. 363,413, Mar. 30, 1982, abandoned, which is a continuation-in-part of Ser. No. 251,976, Apr. 6, 1981, abandoned.

[30] Foreign Application Priority Data

Apr. 9, 1980 [FR] France ............................... 80 08108

[51] Int. Cl.³ ............................................... C08F 5/54
[52] U.S. Cl. ..................................... 526/136; 526/134; 526/141; 526/142; 526/335; 526/340
[58] Field of Search ............... 526/134, 136, 141, 142, 526/335, 337, 340

[56] References Cited

U.S. PATENT DOCUMENTS

| | | | |
|---|---|---|---|
| 3,182,052 | 5/1965 | Naylor | 526/78 |
| 3,966,691 | 6/1976 | Halasa | 526/340 |
| 4,016,347 | 4/1977 | Sommer et al. | 526/64 |
| 4,020,008 | 4/1977 | Naylor | 526/335 |
| 4,048,427 | 9/1977 | Hargis et al. | 526/337 |
| 4,110,525 | 8/1978 | DeZarauz | 526/177 |
| 4,112,210 | 9/1978 | DeZarauz | 526/187 |
| 4,148,985 | 4/1979 | DeZarauz | 526/177 |
| 4,148,986 | 4/1979 | DeZarauz | 526/177 |
| 4,152,505 | 5/1979 | DeZarauz | 526/187 |
| 4,212,718 | 7/1980 | Pinazzi et al. | 526/317 |
| 4,307,218 | 12/1981 | Bingham | 526/340 |

*Primary Examiner*—Paul R. Michl
*Attorney, Agent, or Firm*—Brumbaugh, Graves, Donohue & Raymond

[57] ABSTRACT

A process of preparing a bimodal or multimodal homopolymer of a conjugated diene or a bimodal or multimodal copolymer of a conjugated diene with another conjugated diene or with a vinyl aromatic compound consists in polymerizing the monomer(s) in a reaction medium at a temperature of between 20° C. and 200° C. in the presence of a catalyst system formed of the reaction product of:

(a) an organic compound of a metal of group 3A of the periodic classification of elements of the Mendeleev Table having one of the following formulas:

$M^1M^3R^1R^2R^3R^4$ $M^2(M^3R^1R^2R^3R^4)_2$ $M^3R^1R^2R^3$ $M^1OM^3R^1R^2$ with (b) at least one electron-donor compound containing at least one heteroatom, and adding to the reaction medium during the course of the polymerization reaction a compound of a transition metal of groups 1b to 7B and 8 or a magnesium compound of the general formula $Mg(A)_2$.

6 Claims, 36 Drawing Figures

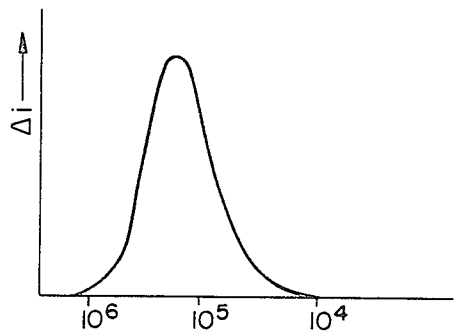
FIG. 1.1
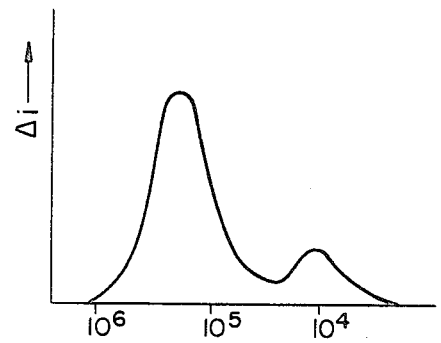
FIG. 1.4
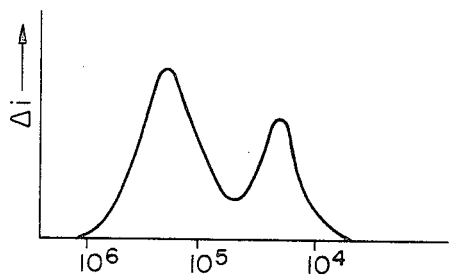
FIG. 1.2
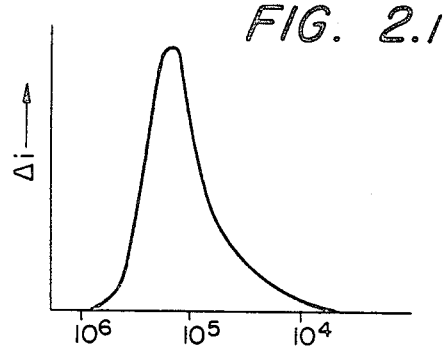
FIG. 2.1
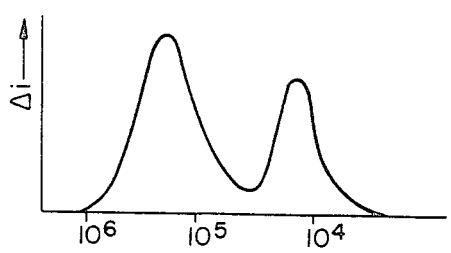
FIG. 1.3
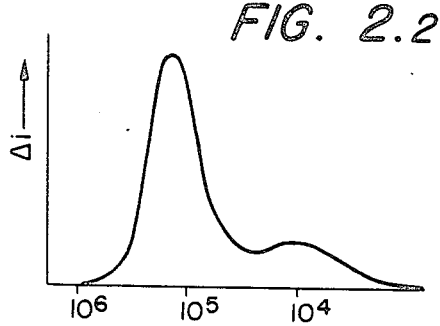
FIG. 2.2

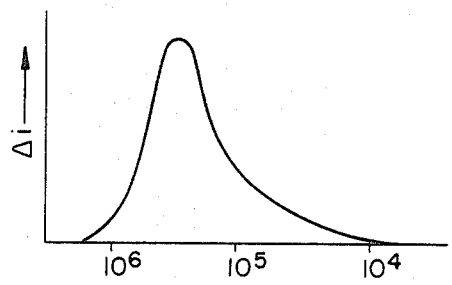
FIG. 3.1
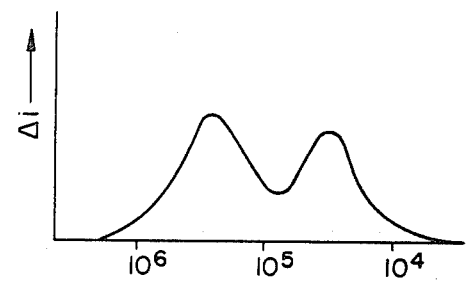
FIG. 3.2
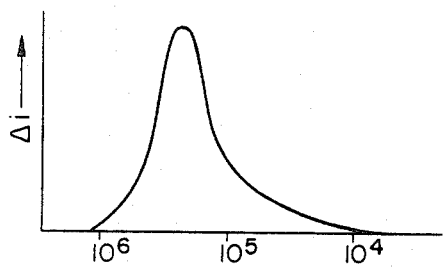
FIG. 4.1
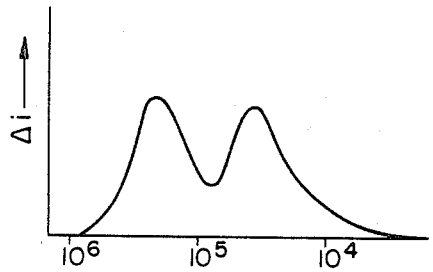
FIG. 4.2
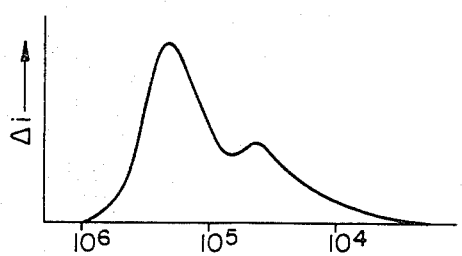
FIG. 4.3

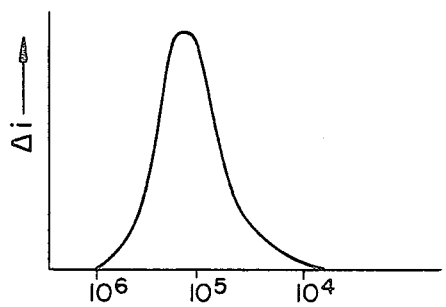
FIG. 5.1
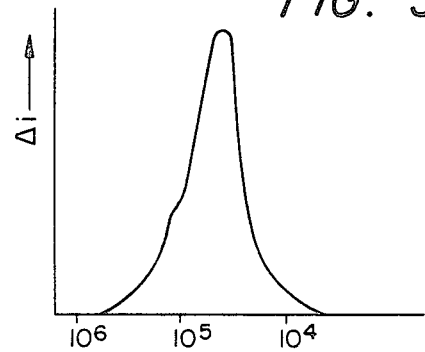
FIG. 5.2
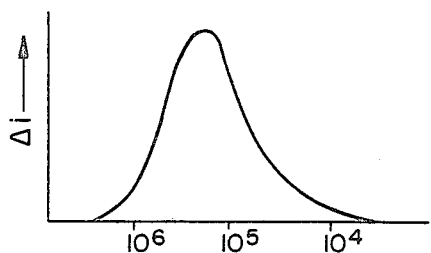
FIG. 6.1
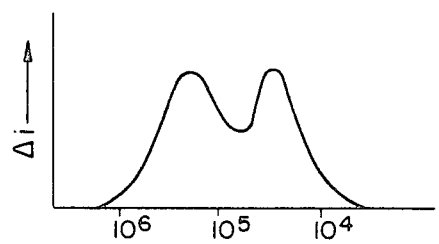
FIG. 6.2
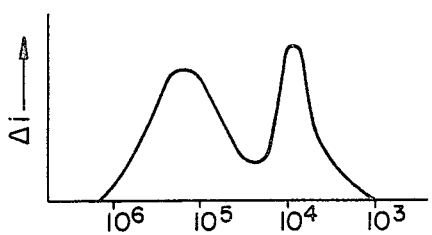
FIG. 6.3

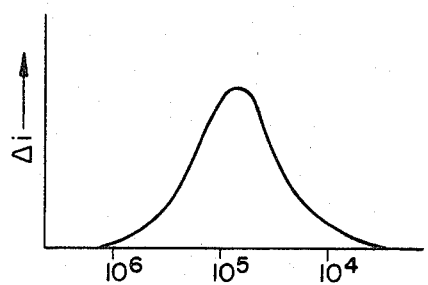
FIG. 7.1
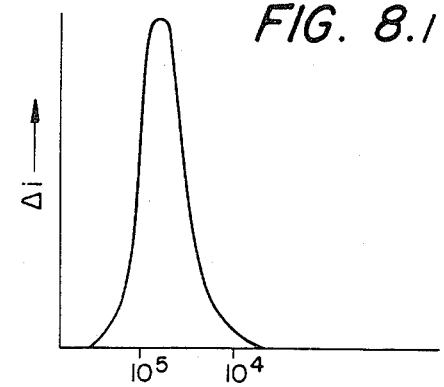
FIG. 8.1
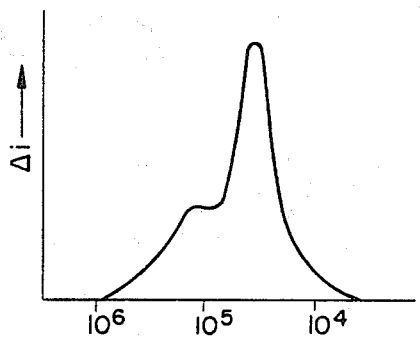
FIG. 7.2
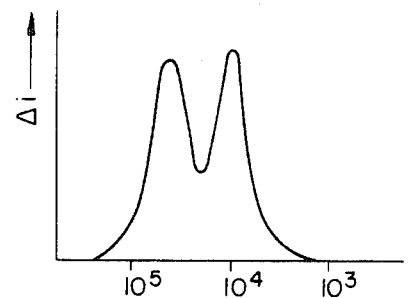
FIG. 8.2
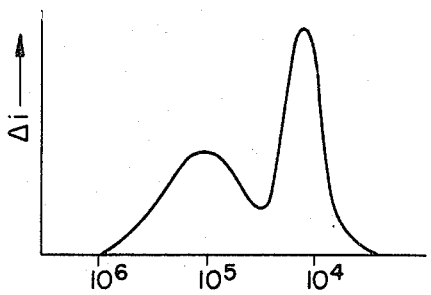
FIG. 7.3
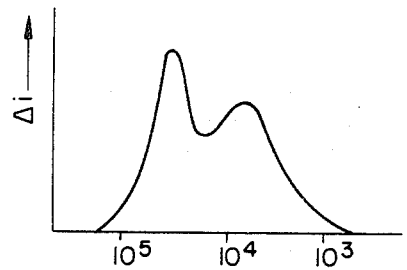
FIG. 8.3

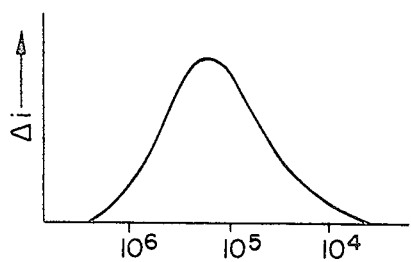
FIG. 9.1
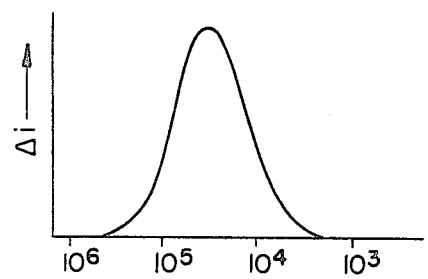
FIG. 10.1
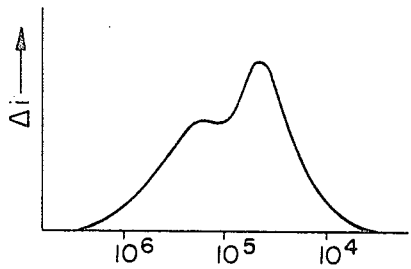
FIG. 9.2
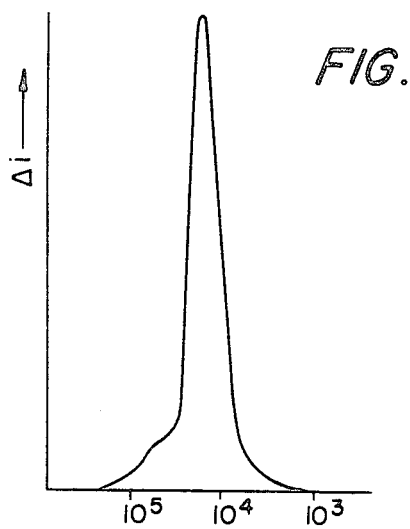
FIG. 10.2
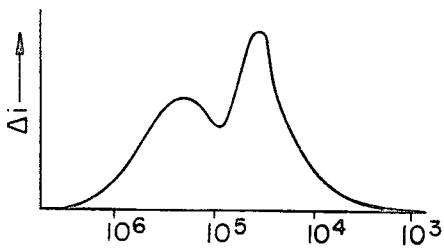
FIG. 9.3

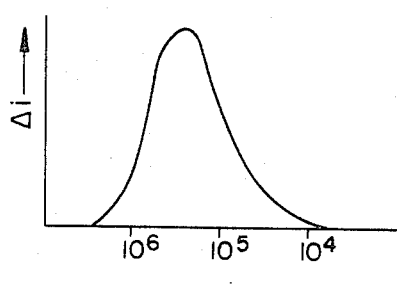
FIG. 11.1
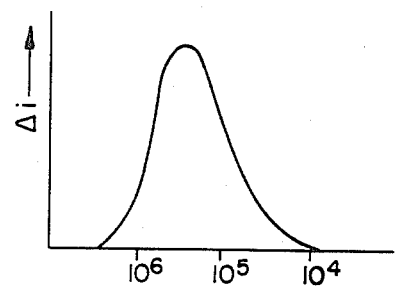
FIG. 12.1
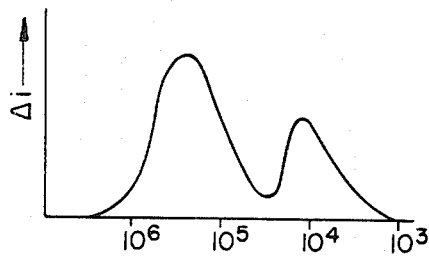
FIG. 11.2
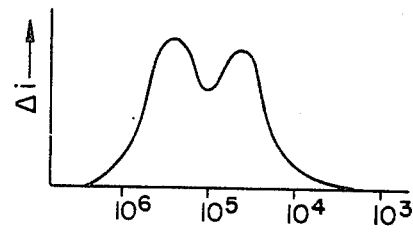
FIG. 12.2

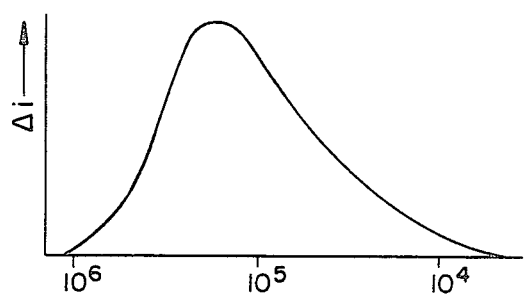
FIG. 13.1
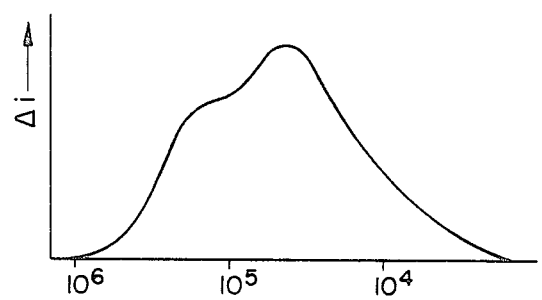
FIG. 13.2
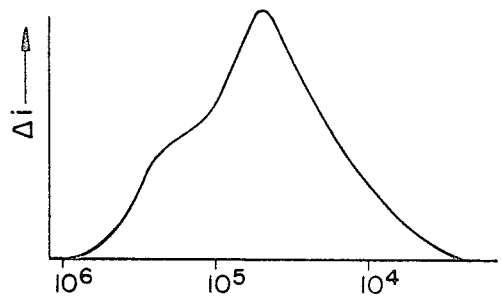
FIG. 13.3
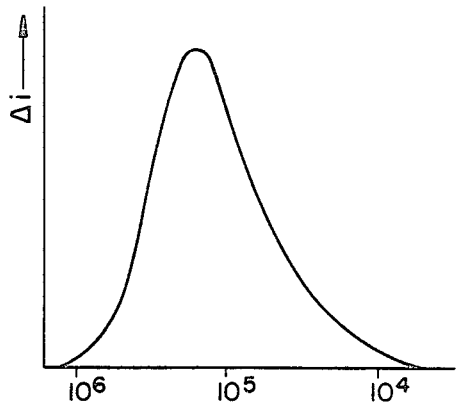
FIG. 14.1
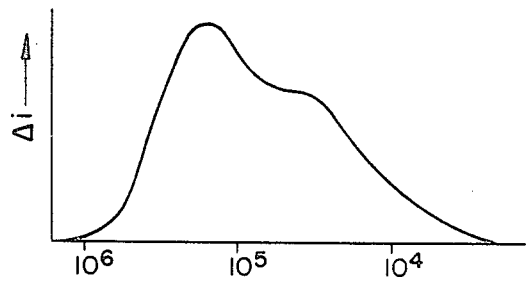
FIG. 14.2

PROCESS FOR PREPARING BIMODAL AND MULTIMODAL POLYMERS OF CONJUGATED DIENES

This application is a continuation application of U.S. application Ser. No. 363,413, filed Mar. 30, 1982, now abandoned, which in turn is a continuation-in-part application of U.S. application Ser. No. 251,976, filed Apr. 6, 1981 (now abandoned).

The object of the present invention is a process which makes it possible to modify the molecular weight distribution upon the synthesis of a homopolymer of a conjugated diene or a copolymer of a conjugated diene with another conjugated diene or with a vinyl aromatic compound.

BACKGROUND OF THE INVENTION

From West German patent application No. 26 07 721 (which corresponds to U.S. Pat. Nos. 4,110,525, 4,112,210, 4,148,985, 4,148,986 and 4,152,505) it is known to prepare a homopolymer of a conjugated diene or a copolymer of a conjugated diene with another conjugated diene or with a vinyl aromatic compound having extremely different microstructures and a monomodal distribution of the molecular weights by means of a catalyst system formed of the reaction product of:

(a) an organic compound of a metal of group 3A of the periodic classification of elements of the Mendeleev Table having one of the following formulas:

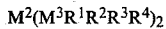

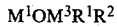

in which $M^1$ represents an alkali metal, $M^2$ represents an alkaline earth metal, $M^3$ represents a metal of group 3A, $R^1$, $R^2$, $R^3$ represent an alkyl or aralkyl radical and $R^4$ represents either an alkyl or aralkyl radical or a radical XB in which X represents an oxygen, sulfur or nitrogen atom and B represents an alkyl or aralkyl radical or a radical $M^3(R^5R^6)$ in which $R^5$, $R^6$ represent an alkyl or aralkyl radical, with (b) at least one electron-donor compound containing at least one heteroatom selected from the group consisting of aprotic polar compounds, protic polar compounds and compounds formed of the reaction products of protic polar compounds with an alkali metal or with an alkaline earth metal.

It is desirable to have means which make it possible to modify and regulate the distribution of the molecular weights of the homopolymer of a conjugated diene or a copolymer of a conjugated diene with another conjugated diene or with a vinyl aromatic compound for a number of industrial uses of these products, since the modification of the molecular weight distribution makes it possible to improve greatly certain properties such as, for instance, the machineability, the cold flow, the raw coherence, the raw tackiness, etc., without penalizing the other properties.

It is known to the man skilled in the art that it is possible to broaden the molecular weight distribution and obtain bimodal or multimoldal polymers (e.g., EPT polymers) by mixing together several polymers of different viscosity.

However, such a process has the drawback of requiring the separate synthesis of several polymers of different viscosities, which results in problems of reproducibility of the process, requires very large quantities of catalyst, results in long periods of time and finally makes this process uninteresting both from a technical standpoint and from an economic standpoint.

It is also known to modify the molecular weight distribution of homopolymers and copolymers in processes carried out either batchwise or continuously by breaking up the amount of catalyst necessary and adding it at different times during the course of the homopolymerization or copolymerization. However, such a manner of operation, which also requires very large amounts of catalyst, which are larger the greater the desired broadening of the molecular weight distribution is, is therefore also very expensive. Furthermore, it would be extremely difficult to carry out industrially.

SUMMARY OF THE INVENTION

The object of the present invention is to remedy these drawbacks by providing a process which is economically more interesting and which makes it possible easily to modify and regulate the molecular weight distribution during the course of the synthesis of a homopolymer of a conjugated diene or a copolymer of a conjugated diene with another conjugated diene or with a vinyl aromatic compound and to obtain a bimodal or multimodal homopolymer or copolymer.

The applicant has unexpectedly found that it is possible to achieve this purpose when the homopolymerization of the conjugated diene or the copolymerization of the conjugated diene with another conjugated diene or with a vinyl aromatic compound by the use of the catalyst systems described above is effected in the presence of a modifying agent which is not a polymerization initiator.

Thus, the present invention concerns a process of preparing a homopolymer of a conjugated diene or a copolymer of a conjugated diene with another conjugated diene or with a vinyl aromatic compound, whether bimodal or multimodal, which consists in polymerizing the monomer(s) in a reaction medium at a temperature of between 20° C. and 200° C. in the presence of a catalyst system formed of the reaction product of:

(a) an organic compound of a metal of group 3A of the periodic classification of elements of the Mendeleev Table having one of the following formulas:

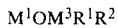

in which $M^1$ represents an alkali metal, $M^2$ represents an alkaline earth metal, $M^3$ represents a metal of group 3A, $R^1$, $R_2$, $R^3$ represent an alkyl or aralkyl radical and $R^4$ represents either an alkyl or aralkyl radical or a radical XB in which X represents an oxygen, sulfur or nitrogen atom and B represents an alkyl or aralkyl radical or a radical $M^3(R^5R^6)$ in which $R^5$, $R^6$ represent an alkyl or aralkyl radical, with (b) at least one electron-donor compound containing at least one heteroatom selected from the group consisting of aprotic polar compounds, protic polar compounds and compounds formed of the reaction products of protic polar compounds with an alkali metal or with an alkaline earth metal, characterized by adding to the reaction medium during the course of the polymerization reaction, as a modifying agent which is not a polymerization initiator, a compound of a transition metal of groups 1B to 7B and 8 of the periodic classification of elements of the Mendeleev Table or a magnesium compound of the general formula Mg(A)$_2$ in which A represents an alkyl radical having from 1 to 10 carbon atoms or an alcoholate, phenate, beta-diketonate or carboxylate radical.

The present invention also concerns some of the polymers produced by the process of the invention, namely, a copolymer of a conjugated diene with another conjugated diene or with a vinyl aromatic compound, characterized by the following features:

(a) it has a bimodal distribution of the molecular weights;

(b) the fraction of the high molecular weights has an inherent viscosity greater than about 1.2 dln/g and the fraction of the low molecular weights has an inherent viscosity of less than about 0.8 dln/g;

(c) the percentage, by weight, of the high molecular weights is between 10% and 90%;

(d) the percentage of trans-1,4 linkages of the high molecular weights is greater than about 72% and the percentage of 1,2-linkages of the high molecular weights is less than about 5%; and (e) the content of the other conjugated diene or the vinyl aromatic compound is identical or different in the fractions of high molecular weights and low molecular weights, and is between about 3% and 50% by weight.

DETAILED DESCRIPTION OF THE INVENTION

The periodic classification of elements of the Mendeleev Table referred to herein is that given in the 59th edition of the "Handbook of Chemistry and Physics".

This process makes it possible to modify the molecular weight distribution as desired and to obtain improved properties of raw tackiness, raw coherence and machineability without requiring additional amounts of catalyst and without, at the same time, penalizing the other properties.

The process of the invention makes it possible to obtain homopolymers and copolymers having bimodal or multimodal molecular weight distributions. The fraction or fractions obtained after addition of the modifying agent are of low molecular weight. Furthermore, the average molecular weights of said fraction or fractions of low molecular weight as well as the quantity of these low molecular weights are a function of the nature of the modifying agent, of the amount of the modifying agent added and of the time when this modifying agent is added during the course of the polymerization reaction. The microstructure of the diene portion of the high and low molecular weights is identical or different.

For a given modifying agent it is possible, by selecting the amount to be added and the time of the addition as a function of the percentage of conversion of the monomers at the time in question as compared with the final conversion percentage, to prepare bimodal or multimodal homopolymers and copolymers, the quantity of the high and low molecular weights of which as well as the respective average molecular weights of these high and low molecular weights can be regulated as desired. Although the amount of modifying agent which is necessary depends on the nature of the modifying agent and the extent of the modification of the molecular weight distribution sought, it is desirable to use such amounts thereof that the molar ratio of the modifying agent to the organic compound of the metal of group 3A is between 0.01 and 20.

Depending on the nature of the modifying agent used it is possible, in the fraction of the low molecular weights, either to retain the same microstructure as that of the fraction of high molecular weights which depends completely on the catalyst used, which is true, for instance, when using magnesium dialkyl compounds, or to decrease the percentage of trans-1,4-linkages, which is true, for instance, with compounds of magnesium other than the dialkyl derivatives. Finally, the modifying agent in numerous cases makes it possible to increase the polymerization reaction kinetics even though it is not itself a polymerization initiator.

The modifying agent is added during the course of the polymerization reaction and preferably when the conversion of the monomers is between 20% and 90%. The polymerization process can be conducted in bulk or in solution in a hydrocarbon solvent either batchwise or continuously. In the latter case, one operates in two or more reactors placed in series at identical or different polymerization temperatures. Depending on the extent of the effect desired the modifying agent is added in one or more portions.

As representative examples of the magnesium compounds which can be used as the modifying agent mention may be made of the magnesium dialkyl compounds, such as dioctyl magnesium, di-n-butyl magnesium, di-sec-butyl magnesium, n-butyl sec-butyl magnesium, ethyl sec-butyl magnesium and butyl octyl magnesium. Among the magnesium compounds without carbon-metal bond mention may be made of the alcoholates, phenates, beta-diketonates, carboxylates and in particular the ether alcoholates of magnesium having the formula:

$$Mg[O(CH_2CH_2O)_nR]_2$$

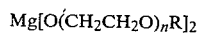

in which R is a lower alkyl radical, such as magnesium ethyl diglycolate. They have the advantage of being soluble in aliphatic and aromatic solvents.

With respect to the compounds of a transition metal which can be used as the modifying agent, compounds of all transition metals can be used regardless of the degree of valence of the transition metal. However, transition metals in the form of organic salts are particularly suitable, especially the alcoholates, phenates, beta-diketonates and carboxylates. Manganese, iron, cobalt in the CoII form, copper in CuI form, zinc and nickel are preferably used as the transition metal.

In the polymerization process of the invention aliphatic solvents, such as hexane and heptane, or aromatic solvents, such as benzene and toluene can be used as a hydrocarbon solvent.

The organometallic compounds of a metal of group 3A which are particularly suitable as components of the catalyst system are those in which the group 3A metal is boron, aluminum, gallium, indium and thallium and those in which the alkali metal is lithium, sodium or potassium and those in which the alkaline earth metal is magnesium, calcium, strontium or barium. For example, the following compounds may be mentioned: $Al(CH_3)_3$, $Al(C_2H_5)_3$, $Al(i-C_4H_9)_3$, $Li[Al(C_2H_5)_4]$, $Na[Al(C_2H_5)_4]$, $K[Al(C_2H_5)_4]$, $Li[Al(C_2H_5)_3OC_2H_5]$, $Li[Al(C_2H_5)_3OAl(C_2H_5)_2]$, $Mg[Al(C_2H_5)_4]_2$, $C_2H_5MgAl(C_2H_5)_4$, $Ca[Al(C_2H_5)_4]_2$, $Sr[Al(C_2H_5)_4]_2$, $Ba[Al(C_2H_5)_4]_2$, $Ba[Al(C_2H_5)_3OC_2H_5]_2$, $Ba[Al(isoC_4H_9)_4]_2$, $LiOAl(C_2H_5)_2$, $NaOAl(C_2H_5)_2$, $B(CH_3)_3$, $B(C_2H_5)_3$, $LiB(C_2H_5)_4$, $LiB(C_2H_5)_3C_4H_9$, $Ga(C_2H_5)$, $In(C_2H_5)_3$, $Tl(C_2H_5)_3$.

As aprotic polar compounds there are particularly suitable the ethers and particularly the cyclic ethers, such as tetrahydrofuran, dioxane and the corresponding thioethers, the tertiary amines such as N,N,N',N'-tetramethylethylene diamine, the aromatic amines and, in particular, the derivates of pyridine and the corresponding oxides, the phosphorus compounds such as phosphines and their oxides, phosphites, phosphoroamides and, in particular, hexamethylphosphorotriamide, the ketones and particularly acetone, the nitriles and particularly acetonitrile, the aldehydes, the esters, the amides, the nitroaliphatic or aromatic compounds, the sulfoxides and particularly dimethylsulfoxide, the sulfones and the sulfites.

As protic polar compounds there are suitable, in particular, water, the alcohols and particularly methanol, the primary or secondary amines and the thiols.

As compounds formed of the reaction products of protic polar compounds with an alkali metal or with an alkaline earth metal there are particularly suitable the alcoholates and the phenates of an alkali metal or an alkaline earth metal, the alkali metal or alkaline earth mercapto- and thiophenates as well as the ether-alcoholate and amine-alcoholate compounds.

The process of the invention is particularly suitable for the homopolymerization of a conjugated diene or the copolymerization of a conjugated diene with another conjugated diene or with a vinyl aromatic compound.

As representative examples of conjugated dienes there are suitable, in particular, butadiene-1,3, isoprene, 2,3-dimethyl-butadiene-1,3, pentadiene-1,3, 2-methylpentadiene-1,3 and 2,4-hexadiene.

As representative examples of vinyl aromatic compounds there are suitable, in particular, styrene, ortho-, meta- and para-methylstyrene, "vinyl toluene", the di- and poly-methylstyrenes, p-tertiobutyl styrene, the vinyl naphthalenes, the methoxystyrenes, the halostyrenes, vinyl mesitylene and divinyl benzene.

The following nonlimitative examples are given by way of illustration of the invention. In these examples, the average inherent viscosities (dln/g) of all the homopolymers and copolymers and the inherent viscosities (dln/g) of the high molecular weight (HMW) fractions and low molecular weight (LMW) fractions of the bimodal copolymers of the invention are established at 25° C. in a 1 g./liter solution in toluene; the concentrations of compounds constituting the catalyst system and the modifying agent are expressed in micromols per 100 g. of monomers. The average percentages of 1,2 (or vinyl) and trans-1,4 linkages are expressed with respect to the polybutadiene portion and the average percentage of styrene is expressed with respect to the total amount of copolymer obtained.

The time elapsed between the start of the polymerization reaction and the moment when the modifying agent is added is designated in the examples as "elapsed time", and the percentage of conversion reached at the time of the addition of the modifying agent is designated by "% conv.".

BRIEF DESCRIPTION OF THE DRAWINGS

The figures of the drawings show the distribution of the molecular weights of the homopolymers or copolymers obtained at the end of the polymerization reaction which was obtained by gel permeation chromatography. The molecular weights are shown on the abscissa and the refraction index difference $\Delta i$ on the ordinate.

FIG. 1

Four tests were carried out. Into 250 ml. Steinie bottles under pressure of rectified nitrogen there were introduced 100 ml. of heptane as solvent, 3.1 g. of styrene and 10.5 g. of butadiene. The catalyst system formed of $LiAlEt_3Bu$ and $[Et(OCH_2CH_2)_2O]_2Ba$ was then added in the order indicated. The bottles were placed in a tank maintained thermostatically at 75° C. in which they were agitated. n-butyl sec-butyl magnesium was added to three bottles during the course of polymerization. After two hours all the polymerizations were stopped by addition of methanol and the copolymer was recovered in conventional manner.

The results are set forth in Table I and in FIGS. 1.1–1.4.

The addition of the modifying agent makes it possible to produce low moleuclar weights. The value of the low molecular weights depends on the amount of modifying agent added, while their proportion with respect to the high molecular weights depends both on the percentage of conversion at which $R_2Mg$ has been added and the final conversion percentage.

FIG. 2

Two tests were carried out in accordance with the same procedure as in Example 1, using magnesium ethyl diglycolate as the modifying agent in one of the tests.

The results are set forth in Table II and in FIGS. 2.1–2.2.

FIG. 3

Two tests were carried out. 100 ml. of toluene and 17.5 g of monomers comprising 77% by weight butadiene and 23% by weight styrene were added to 250 ml. Steinie bottles under pressure of rectified nitrogen. The catalyst system formed of $LiAlEt_3Bu$ and $Et(OCH_2CH_2)_2OLi$ was then added in the order indicated. The bottles were then placed in a tank maintained thermostatically at 75° C. in which they were agitated. During the course of the polymerization, n-butyl sec-butyl magnesium was added to one of the bottles. After two hours the polymerizations were stopped by the addition of methanol and the copolymer was recovered in conventional manner.

The results are set forth in Table III and in FIGS. 3.1–3.2.

The addition of the modifying agent induces low molecular weights without modifying the microstructure of the final copolymer.

FIG. 4

Three tests were carried out. 128 ml. of heptane and 17.5 g. of monomer comprising 77% by weight butadiene and 23% by weight styrene were added in succession into 250 ml. Steinie bottles under pressure of rectified nitrogen. The catalyst system formed of $Ba[AlEt_4]_2$ and $Et(OCH_2CH_2)_2OLi$ was then added in the order indicated. The bottles were then placed in a tank which was maintained thermostatically at 80° C. in which they were agitated. During the course of the polymerization either n-butyl sec-butyl magnesium or magnesium ethyl diglycolate $Mg[O(CH_2CH_2O)_2Et]_2$ was added to two bottles.

After an hour and a half, all the polymerizations were stopped by the addition of methanol and the copolymer was recovered in conventional manner.

The results are set forth in Table IV and in FIGS. 4.1–4.3.

The addition of $Mg(OR)_2$ or $R_2Mg$ during the course of polymerization induces low viscosities and distributions of the bimodal type. The bimodal copolymer obtained in Test No. 2 consists of 55% by weight of a fraction of high molecular weight of average inherent viscosity of 1.4 and of 45% by weight of a fraction of low molecular weight of average inherent viscosity of 0.75. The microstructure of the high and low weight portions is 1,2: 3%; trans: 84%; styrene: 9%; and 1,2: 3%; trans: 83%; styrene: 181%, respectively.

FIG. 5

Two tests were carried out. 100 ml. of heptane as solvent and 13.6 g. of butadiene were introduced into 250 ml. Steinie bottles under pressure of rectified nitrogen. The catalyst system formed of:
triethyl aluminum $AlEt_3$
barium nonyl phenate $Ba(OR)_2$
lithium isopropylate LiOR
was then added in the order indicated.

The bottles were then placed in a tank which was maintained thermostatically at 80° C. and was agitated.

n-butyl sec-butyl magnesium was added to one of the bottles during the course of the polymerization. After two and a half hours the polymerization was stopped in the control bottle (Test 1) while the bottle of Test 2 was stopped after an hour and a half by the addition of methanol. The homopolymer was then recovered in conventional manner.

The results are set forth in Table V and in FIGS. 5.1–5.2.

It is noted:
that the addition of $R_2Mg$ accelerates the polymerization velocity and induces low molecular weights.

FIG. 6

Three tests were carried out. 100 ml. of heptane as solvent, 2.72 g. of styrene and 10.9 g. of butadiene were added into 250 ml. Steinie bottles under the pressure of rectified nitrogen. The catalyst system formed of
$LiBBu_4$ (lithium boron tetrabutyl)
$[Et(OCH_2CH_2)_2O]_2Ba$ (barium ethyl diglycolate)
was then added in the order indicated.

The bottles were then placed in a tank maintained thermostatically at 80° C. and then agitated. During the course of polymerization ethyl sec-butyl magnesium was added to certain bottles (Tests 2 and 3). After two hours all the polymerizations were stopped by addition of methanol. The copolymer was then recovered in conventional manner.

The results are set forth in Table VI and in FIGS. 6.1–6.3.

FIG. 7

Three tests were carried out. 130 ml. of heptane and 17.5 g. of butadiene were added to 250 ml. Steinie bottles under pressure of rectified nitrogen. The catalyst system formed of
$AlEt_3$
barium ethyl glycolate $[EtOCH_2CH_2O]_2Ba$
was then added in the order indicated.

The bottles were then placed in a tank which was maintained thermostatically at 80° C. in which they were agitated.

n-butyl sec.-butyl magnesium was added during the course of polymerization to certain bottles (Tests 2 and 3). At the end of 24 hours all the polymerizations were stopped by addition of methanol in suitable amount. The homopolymer was then recovered in conventional manner.

The results are set forth in Table VII and in FIGS. 7.1–7.3.

FIG. 8

The manner of operation of Example 7 was repeated except that 100 ml. of toluene and 17.5 g. of butadiene were used and that the catalyst system was formed of:
$AlEt_3$
lithium isopropylate LiOR The results are set forth in Table VIII and in FIGS. 8.1–8.3.

FIG. 9

Three tests were carried out. 87.5 g. of perfectly pure toluene and then 17.5 g. of monomers comprising 4.86 ml. of styrene and 13.10 ml. of butadiene were introduced into 250 ml. Steinie bottles under pressure of rectified nitrogen. The catalyst system formed of
$Ba[AlEt_4]_2$
gamma picoline
was then added.

The bottles were then placed in a tank which was maintained thermostatically at 80° C. in which they were agitated. n-butyl sec.-butyl magnesium was added during the course of polymerization to certain bottles (Tests 2 and 3). After 5 hours all the polymerizations were stopped by addition of methanol in suitable amount. The copolymer was then recovered in conventional manner.

The results are set forth in Table IX and in FIGS. 9.1–9.3.

FIG. 10

Two tests were carried out. 87.5 g. of heptane and 17.5 g. of butadiene were introduced into Steinie bottles under pressure of rectified nitrogen. The catalyst system formed of
$LiOAlEt_2$
$Et(OCH_2CH_2)_2ONa$
was then added.

The bottles were then placed in a tank maintained thermostatically at 80° C. in which they were agitated. n-butyl sec.-butyl magnesium was added in Test 2 during the course of polymerization. After 5 hours the polymerizations were stopped by addition of methanol. The homopolymer was then recovered in conventional manner.

The results are set forth in Table X and in FIGS. 10.1–10.2.

FIG. 11

Two tests were carried out. 70 g. of previously purified heptane and 17.5 g. of monomers comprising 1.9 ml. of styrene and 23.8 ml. of butadiene were added into Steinie bottles under the pressure of rectified nitrogen. Thereupon the catalyst system formed of
Ba[AlEt$_4$]$_2$
tetrahydrofuran (THF)
was added.

The bottles were then placed in a tank maintained thermostatically at 80° C. in which they were agitated. Butyl octyl magnesium was added during the course of polymerization to the bottle of Test 2. The polymerizations were stopped at the end of two and a half hours by addition of methanol. The copolymer was then recovered in conventional manner.

The results are set forth in Table XI and in FIGS. 11.1–11.2.

FIG. 12

Two tests were carried out repeating the operating conditions of Example 11 except that Mg[O(CH$_2$CH$_2$O)$_2$Et]$_2$ was used as the modifying agent. The results are set forth in Table XII and in FIGS. 12.1–12.2.

FIG. 13

Three tests were carried out. 100 ml. of toluene and then 16.2 ml. of butadiene and 7.75 ml. of styrene were introduced into 250 ml. Steinie bottles under nitrogen pressure. The catalyst system formed of
LiAlBui-Bu$_3$; (LiAlR$_4$)
[C$_2$H$_5$(OCH$_2$CH$_2$)$_2$O]$_2$Ba; Ba(OR)$_2$
was then added in any order.

The bottles were then placed in a tank maintained thermostatically at 75° C. in which they were agitated. Cuprous ethyl diglycolate of the formula C$_2$H$_5$(OCH$_2$CH$_2$)$_2$OCu was added during the course of polymerization in Tests 2 and 3.

At the end of two and a half hours all the polymerizations were stopped by the addition of methanol and the copolymers were recovered in conventional manner.

The results are set forth in Table XIII and in FIGS. 13.1–13.3.

FIG. 14

Two tests were carried out. 100 ml. of toluene and 17.5 g. of butadiene were added to 250 ml. Steinie bottles under nitrogen pressure. The catalyst system formed of Ba[Al(C$_2$H$_5$)$_4$]$_2$ and lithium ethyl diglycolate C$_2$H$_5$(OCH$_2$CH$_2$)$_2$OLi was then added in any order.

The bottles were then placed in a tank which was maintained thermostatically at 80° C. in which they were agitated.

Cobalt (II) acetylacetonate was added during the course of polymerization in Test 2. At the end of an hour all the polymerizations were stopped by the addition of methanol and the homopolymers were recovered in conventional manner.

The results are set forth in Table XIV and in FIGS. 14.1–14.2.

TABLE I

| | Catalyst System | | Addition R$_2$Mg | | | % | Copolymer | | | | Drawing |
|---|---|---|---|---|---|---|---|---|---|---|---|
| | | | Elapsed | % Conv. at Elapsed | | Final | Inherent | | | % | |
| Test | LiAlR$_4$ | Ba(OR)$_2$ | Time | Time | Amount | Conversion | Viscosity | % 1,2 | % trans. | Styrene | FIG. |
| 1 | 1617 | 735 | | | | 62 | 2.34 | 2.5 | 85 | 11 | 1.1 |
| 2 | 1617 | 735 | 1 h. | 45 | 735 | 72 | 1.8 | 3 | 84 | 13 | 1.2 |
| 3 | 1617 | 735 | 1 h. | 45 | 1470 | 70 | 1.67 | 3 | 83 | 12 | 1.3 |
| 4 | 1617 | 735 | 1½ h. | 55 | 735 | 67 | 2.16 | 3 | 84 | 11 | 1.4 |

TABLE II

| | Catalyst System | | Addition Mg(OR)$_2$ | | | % | Copolymer | | | | Drawing |
|---|---|---|---|---|---|---|---|---|---|---|---|
| | | | Elapsed | % Conv. at Elapsed | | Final | Inherent | | | % | |
| Test | LiAlR$_4$ | Ba(OR)$_2$ | Time | Time | Amount | Conversion | Viscosity | % 1,2 | % trans. | Styrene | FIG. |
| 1 | 2265 | 1030 | | | | 70 | 2.0 | 2.5 | 85.5 | 12 | 2.1 |
| 2 | 2265 | 1030 | 50 min. | 47 | 412 | 60 | 1.55 | 3.5 | 82 | 10 | 2.2 |

TABLE III

| | Catalyst System | | Addition R$_2$Mg | | | % | Copolymer | | | | Drawing |
|---|---|---|---|---|---|---|---|---|---|---|---|
| | | | Elapsed | % Conv. at Elapsed | | Final | Inherent | | | % | |
| Test | LiAlR$_4$ | ROLi | Time | Time | Amount | Conversion | Viscosity | % 1,2 | % trans. | Styrene | FIG. |
| 1 | 1700 | 850 | | | | 85 | 2.65 | 12 | 52 | 6 | 3.1 |
| 2 | 1700 | 850 | 1 h. | 55 | 400 | 77 | 1.85 | 12 | 52 | 5 | 3.2 |

TABLE IV

| | Catalyst System | | Addition of R$_2$Mg (a) or Mg(OR)$_2$(b) | | | | % | Copolymer | | | | Drawing |
|---|---|---|---|---|---|---|---|---|---|---|---|---|
| | | | Elapsed | % Conv. at Elapsed | Amount | | Final | Inherent | | | % | |
| Test | Ba(AlR$_4$)$_2$ | ROLi | Time | Time | (a) | (b) | Conversion | Viscosity | % 1,2 | % trans. | Styrene | FIG. |
| 1 | 1000 | 1500 | | | | | 75 | 1.6 | 2.6 | 85 | 13 | 4.1 |
| 2 | 1000 | 1500 | 30 min. | 47 | | 1000 | 85 | 1.1 | 3 | 82 | 14 | 4.2 |

TABLE IV-continued

| | Catalyst System | | Addition of R₂Mg (a) or Mg(OR)₂(b) | | | | % Final Conversion | Copolymer | | | | Drawing FIG. |
|---|---|---|---|---|---|---|---|---|---|---|---|---|
| Test | Ba(AlR₄)₂ | ROLi | Elapsed Time | % Conv. at Elapsed Time | Amount (a) | (b) | | Inherent Viscosity | % 1,2 | % trans. | % Styrene | |
| 3 | 1000 | 1500 | 30 min. | 47 | | 250 | 65 | 1.3 | 4 | 81 | 11 | 4.3 |

TABLE V

| | Catalyst System | | | Addition of R₂Mg | | | % Final Conversion | Homopolymer | | | Drawing FIG. |
|---|---|---|---|---|---|---|---|---|---|---|---|
| Test | AlEt₃ | Ba(OR)₂ | LiOr | Elapsed Time | % Conv. at Elapsed Time | Amount | | Inherent Viscosity | % 1,2 | % trans. | |
| 1 | 2600 | 650 | 3250 | | | | 60 | 1.52 | 4 | 75 | 5.1 |
| 2 | 2600 | 650 | 3250 | 1 h. | 25 | 1950 | 85 | 0.81 | 4.5 | 76 | 5.2 |

TABLE VI

| | Catalyst System | | Addition of R₂Mg | | | % Final Conversion | Copolymer | | | | Drawing FIG. |
|---|---|---|---|---|---|---|---|---|---|---|---|
| Test | LiBBu₄ | Ba(OR)₂ | Elapsed Time | % Conv. at Elapsed Time | Amount | | Inherent Viscosity | % 1,2 | % trans. | % Styrene | |
| 1 | 4000 | 1333 | | | | 72 | 1.88 | 3 | 83 | 14 | 6.1 |
| 2 | 4000 | 1333 | 1 h. | 58 | 1333 | 79 | 1.27 | 3 | 82 | 15 | 6.2 |
| 3 | 4000 | 1333 | 1 h. | 58 | 2666 | 77 | 1.23 | 3.5 | 81 | 15 | 6.3 |

TABLE VII

| | Catalyst System | | Addition of R₂Mg | | | % Final Conversion | Homopolymer | | | Drawing FIG. |
|---|---|---|---|---|---|---|---|---|---|---|
| Test | AlEt₃ | Ba(OR)₂ | Elapsed Time | % Conv. at Elapsed Time | Amount | | Inherent Viscosity | % 1,2 | % trans. | |
| 1 | 3000 | 1500 | | | | 70 | 1.4 | 5 | 65 | 7.1 |
| 2 | 3000 | 1500 | 8 h. | 50 | 4500 | 100 | 0.67 | 5.2 | 74 | 7.2 |
| 3 | 3000 | 1500 | 8 h. | 50 | 9000 | 1000 | 0.69 | 5.6 | 73 | 7.3 |

TABLE VIII

| | Catalyst System | | Addition of R₂Mg | | | % Final Conversion | Homopolymer | | | Drawing FIG. |
|---|---|---|---|---|---|---|---|---|---|---|
| Test | AlEt₃ | LiOR | Elapsed Time | % Conv. at Elapsed Time | Amount | | Inherent Viscosity | % 1,2 | % trans. | |
| 1 | 3000 | 4500 | | | | 82 | 0.89 | 12 | 52 | 8.1 |
| 2 | 3000 | 4500 | 9 h. | 46 | 4500 | 100 | 0.51 | 14 | 51 | 8.2 |
| 3 | 3000 | 4500 | 9 h. | 46 | 9000 | 96 | 0.48 | 17 | 47 | 8.3 |

TABLE IX

| | Catalyst System | | Addition of R₂Mg | | | % Final Conversion | Copolymer | | | | Drawing FIG. |
|---|---|---|---|---|---|---|---|---|---|---|---|
| Test | Ba[AlEt₄]₂ | Gamma Picoline | Elapsed Time | % Conv. at Elapsed Time | Amount | | Inherent Viscosity | % 1,2 | % trans. | % Styrene | |
| 1 | 400 | 400 | | | | 60 | 1.47 | 5.4 | 66.1 | 23 | 9.1 |
| 2 | 400 | 400 | 50 min. | 27 | 600 | 55 | 1.11 | 5.4 | 70 | 20 | 9.2 |
| 3 | 400 | 400 | 50 min. | 27 | 1200 | 55 | 0.98 | 6.3 | 70 | 20 | 9.3 |

TABLE X

| | Catalyst System | | Addition of R₂Mg | | | % Final Conversion | Homopolymer | | | Drawing FIG. |
|---|---|---|---|---|---|---|---|---|---|---|
| Test | LiOAlEt₂ | RONa | Elapsed Time | % Conv. at Elapsed Time | Amount | | Inherent Viscosity | % 1,2 | % trans. | |
| 1 | 2200 | 2750 | | | | 70 | 0.9 | 63 | 19 | 10.1 |
| 2 | 2200 | 2750 | 1½ h. | 20 | 6600 | 100 | 0.35 | 27 | 45 | 10.2 |

TABLE XI

| | Catalyst System | | Addition of R₂Mg | | | % Final Conversion | Copolymer | | | | Drawing FIG. |
|---|---|---|---|---|---|---|---|---|---|---|---|
| Test | Ba[AlEt₄]₂ | THF | Elapsed Time | % Conv. at Elapsed Time | Amount | | Inherent Viscosity | % 1,2 | % trans. | % Styrene | |
| 1 | 1150 | 4600 | | | | 88 | 2.3 | 3.5 | 80 | 5 | 11.1 |
| 2 | 1150 | 4600 | 1½ h. | 56 | 1150 | 86 | 1.7 | 4 | 79 | 4 | 11.2 |

TABLE XII

| | Catalyst System | | Addition of Mg(OR)₂ | | | % Final Conversion | Copolymer | | | | Drawing FIG. |
|---|---|---|---|---|---|---|---|---|---|---|---|
| Test | Ba[AlEt₄]₂ | THF | Elapsed Time | % Conv. at Elapsed Time | Amount | | Inherent Viscosity | % 1,2 | % trans. | Styrene | |
| 1 | 1150 | 4600 | | | | 80 | 2.47 | 4 | 79 | 4 | 12.1 |
| 2 | 1150 | 4600 | 1 h. | 40 | 1150 | 85 | 1.7 | 4 | 77 | 5 | 12.2 |

TABLE XIII

| | Catalyst System | | Addition of CuI Salt | | | % Final Conversion | Copolymer | | | | Drawing FIG. |
|---|---|---|---|---|---|---|---|---|---|---|---|
| Test | LiAlR₄ | Ba(OR)₂ | Elapsed Time | % Conv. at Elapsed Time | Amount | | Inherent Viscosity | % 1,2 | % trans. | % Styrene | |
| 1 | 1486 | 743 | | | | 80 | 2 | 4.5 | 80 | 26 | 13.1 |
| 2 | 1486 | 743 | 30 min. | 30 | 57 | 84 | 1.4 | 5.1 | 79 | 30 | 13.2 |
| 3 | 1486 | 743 | 30 min. | 30 | 286 | 90 | 1.2 | 6.1 | 78 | 33 | 13.3 |

TABLE XIV

| | Catalyst System | | Addition of CoII Salt | | | % Final Conversion | Homopolymer | | | Drawing FIG. |
|---|---|---|---|---|---|---|---|---|---|---|
| Test | Ba(AlEt₄)₂ | ROLi | Elapsed Time | % Conv. at Elapsed Time | Amount | | Inherent Viscosity | % 1,2 | % trans. | |
| 1 | 1140 | 2280 | | | | 85 | 2.3 | 3 | 81 | 14.1 |
| 2 | 1140 | 2280 | 15 min. | 40 | 60 | 85 | 1.9 | 3 | 81 | 14.2 |

In the above Examples all the copolymers have a content of vinyl aromatic compound between about 3% and about 50% by weight and a percentage, by weight, of the high molecular weights of between 10% and 90%.

In the following Table A there are additional data on the inherent viscosities and percent by weight styrene of the fractions of high molecular weight (HMW) and low molecular weight (LMW) of bimodal copolymers of the invention.

TABLE A

| | | Inherent Viscosity | | % Styrene | |
|---|---|---|---|---|---|
| Examples | Tests | HMW | LMW | HMW | LMW |
| 1 | 2 | 2.70 | 0.20 | 8 | 21 |
| | 3 | 2.00 | 0.15 | 8 | 19 |
| | 4 | 2.52 | 0.16 | 9 | 20 |
| 2 | 2 | 1.50 | 0.31 | 8 | 14 |
| 4 | 2 | 1.40 | 0.75 | 9 | 18 |
| | 3 | 1.80 | 0.50 | 9 | 16 |
| 6 | 2 | 1.70 | 0.41 | 10 | 30 |
| | 3 | 1.95 | 0.13 | 10 | 30 |
| 11 | 2 | 2.7 | 0.33 | 3 | 6 |
| 12 | 2 | 3.3 | 0.45 | 3.5 | 6.5 |
| 13 | 2 | 2.5 | 0.57 | 13 | 38 |

In the bimodal copolymers of the invention illustrated by the Examples of the above Table A, the percentage of trans-1,4 linkages of the high molecuar weights is greater than about 72% and the percentage of 1,2-linkages of the high molecular weights is less than about 5%.

What is claimed is:

1. A process of preparing a bimodal or multimodal homopolymer of a conjugated diene or a bimodal or multimodal copolymer of a conjugated diene with another conjugated diene or with a vinyl aromatic compound, consisting in polymerizing the monomer(s) in a reaction medium at a temperature of between 20° C. and 200° C. in the presence of a catalyst system formed of the reaction product of:
(a) an organic compound of a metal of group 3A of the periodic classification of elements of the Mendeleev Table having one of the following formulas:

$M^1M^3R^1R^2R^3R^4$ $M^2(M^3R^1R^2R^3R^4)_2$ $M^3R^1R^2R^3$ $M^1OM^3R^1R^2$ in which $M^1$ represents an alkali metal, $M^2$ represents an alkaline earth metal, $M^3$ represents a metal of group 3A, $R^1$, $R^2$, $R^3$ represent an alkyl or aralkyl radical and $R^4$ represents either an alkyl or aralkyl radical or a radical XB in which X represents an oxygen, sulfur or nitrogen atom and B represents an alkyl or aralkyl radical or a radical $M^3(R^5R^6)$ in which $R^5$, $R^6$ represent an alkyl or aralkyl radical, with (b) at least one electron-donor compound containing at least one heteroatom selected from the group consisting of aprotic polar compounds, protic polar compounds and compounds formed of the reaction products of protic polar compounds with an alkali metal or with an alkaline earth metal, characterized by adding to the reaction medium during the course of the polymerization reaction, as a modifying agent which is not a polymerization initiator, a compound of a metal of groups 1B to 7B and 8 of the periodic classification of elements of the Mendeleev Table or a magnesium compound of the general formula $Mg(A)_2$ in which A represents an alkyl radical having from 1 to 10 carbon atoms or an alcoholate, phenate, beta-diketonate or carboxylate radical; said modifying agent being added in such amount that the molar ratio of the modifying agent to the organic compound of the metal of group 3A is between 0.01 and 20.

2. A process according to claim 1, characterized by the fact that the modifying agent is selected from among compounds of the following metals: manganese, iron, cobalt, copper, zinc and nickel.

3. A process according to claim 1 or 2, characterized by the fact that the modifying agent is an alcoholate, phenate, beta-diketonate or carboxylate.

4. A process according to claim 1, characterized by the fact that the modifying agent is selected from among n-butyl sec-butyl magnesium, magnesium ethyl diglycolate and ethyl sec-butyl magnesium.

5. A process according to claim 1, characterized by the fact that the polymerization is conducted in hydrocarbon solvent.

6. A process according to claim 1, characterized by the fact that the polymerization is conducted continuously.

* * * * *

UNITED STATES PATENT AND TRADEMARK OFFICE
CERTIFICATE OF CORRECTION

PATENT NO. : 4,507,451

DATED : March 26, 1985

INVENTOR(S) : Christian Freppel

It is certified that error appears in the above-identified patent and that said Letters Patent is hereby corrected as shown below:

Col. 2, line 56, "$M^2(M^3R_1R^2R^3R^4)_2$" should read -- $M^2(M^3R^1R^2R^3R^4)_2$ --; line 63, "$R_2$" should read -- $R^2$ --. Col. 5, line 9, "$Ga(C_2H_5)$" should read -- $Ga(C_2H_5)_3$ --. Col. 6, lines 11, 35, 42, 61; col. 7, lines 23, 47, 65; col. 8, lines 17, 27, 47, 65; col. 9, lines 16, 22; and col. 10, line 14; each occurrence, "FIG." should read -- Example --. Col. 7, line 21, "181%" should read -- 18% --.

Signed and Sealed this

Twenty-seventh Day of August 1985

[SEAL]

Attest:

DONALD J. QUIGG

Attesting Officer　　　Acting Commissioner of Patents and Trademarks